US008021473B2

(12) United States Patent
McIntyre et al.

(10) Patent No.: US 8,021,473 B2
(45) Date of Patent: Sep. 20, 2011

(54) PROCESS FOR MANUFACTURING INKS AND PIGMENT FORMULATIONS AND INK JET INKS MADE BY THE PROCESS

(75) Inventors: Charles Rupert McIntyre, Stirlingshire (GB); Gary Cuthbertson, Stirlingshire (GB); Peter Mark Godfrey, Stirlingshire (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 78 days.

(21) Appl. No.: 11/988,010

(22) PCT Filed: Jul. 6, 2006

(86) PCT No.: PCT/GB2006/002494
§ 371 (c)(1),
(2), (4) Date: Dec. 28, 2007

(87) PCT Pub. No.: WO2007/007047
PCT Pub. Date: Jan. 18, 2007

(65) Prior Publication Data
US 2009/0114120 A1 May 7, 2009

(30) Foreign Application Priority Data
Jul. 8, 2005 (GB) .................................. 0513978.7

(51) Int. Cl.
*C09D 11/00* (2006.01)
(52) U.S. Cl. .................................. 106/31.65; 106/31.86
(58) Field of Classification Search ................. 106/31.65
See application file for complete search history.

(56) References Cited

U.S. PATENT DOCUMENTS

| 3,865,607 A | | 2/1975 | Games ......................... 427/145 |
| 3,923,538 A | * | 12/1975 | Jackson ....................... 106/433 |
| 4,772,540 A | | 9/1988 | Deutsch et al. ............... 430/320 |
| 4,810,390 A | | 3/1989 | Flierl et al. .................... 210/650 |
| 5,543,046 A | | 8/1996 | Van Rijn ....................... 210/490 |
| 5,716,435 A | * | 2/1998 | Aida et al. .................. 106/31.85 |
| 5,753,014 A | | 5/1998 | Van Rijn .......................... 96/12 |

(Continued)

FOREIGN PATENT DOCUMENTS
NL 1024292 3/2005

OTHER PUBLICATIONS

Richard W. Baker, "Kirk-Othmer Encyclopedia of Chemical Technology, Membrane Technology", (Dec. 4, 2000) XP002422355.

*Primary Examiner* — Jerry Lorengo
*Assistant Examiner* — Veronica F Faison
(74) *Attorney, Agent, or Firm* — Morgan Lewis & Bockius LLP

(57) ABSTRACT

A process for manufacturing an ink, or pigment formulation (e.g. a concentrate) for use in inks, comprising filtration of a composition comprising a particulate pigment and a liquid medium through an inorganic filter having pores of a uniform size below 10 microns. The process accurately removes oversized particles that could cause problems in inkjet printers without wasting non-problematic under-sized pigment. High flow rates are achieved even with low trans-filter pressure differences. In one embodiment, high flow rates are maintained by selection of pH and/or ionic strength. The filters are more robust than conventional polymeric filters and withstand cleaning with aggressive cleaning agents.

12 Claims, 3 Drawing Sheets

U.S. PATENT DOCUMENTS

Figure 1:
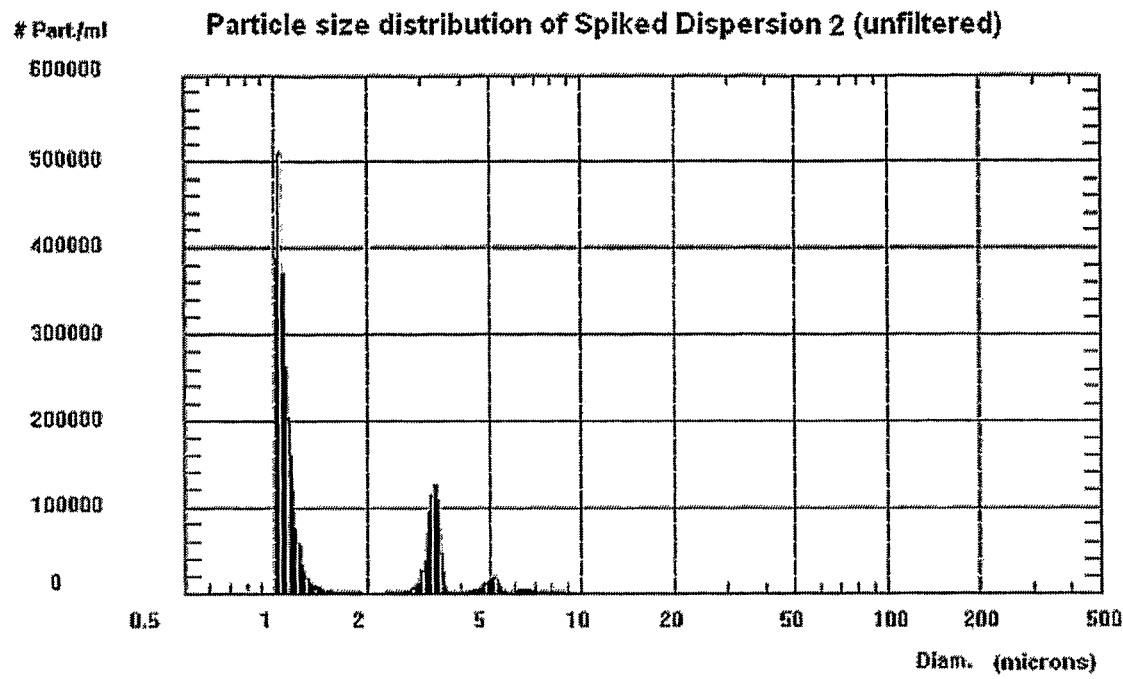

| | | | |
|---|---|---|---|
| 5,773,519 A * | 6/1998 | Ito et al. | 525/276 |
| 6,321,915 B1 | 11/2001 | Wilson et al. | 210/505 |
| 6,494,943 B1 | 12/2002 | Yu et al. | 106/31.65 |
| 6,506,245 B1 | 1/2003 | Kinney et al. | 106/493 |
| 6,562,117 B2 | 5/2003 | Sano et al. | 106/31.6 |
| 2001/0050017 A1 * | 12/2001 | Ohsawa et al. | 101/465 |
| 2004/0028875 A1 | 2/2004 | Van Rijn et al. | 428/98 |
| 2005/0139122 A1 * | 6/2005 | Allen et al. | 106/31.6 |
| 2007/0058014 A1 | 3/2007 | Burglin | 347/100 |
| 2007/0068865 A1 | 3/2007 | Pronk | 210/321.84 |

* cited by examiner

PROCESS FOR MANUFACTURING INKS AND PIGMENT FORMULATIONS AND INK JET INKS MADE BY THE PROCESS

This invention relates to processes for manufacturing inks and pigment formulations, to inks and pigment formulations (e.g. concentrates) made by the processes and to their uses in ink jet printing.

Ink jet printing is a printing method in which droplets of an ink are ejected through a fine nozzle and deposited on recording media, such as paper, to perform printing. In recent years ink jet printers have become commonplace in the home and in small offices as a quick and efficient way of printing text, images and the like.

Ink jet printers used in the home and in small offices generally use inks comprising water as the predominant ingredient, a colorant and a wetting agent, such as glycerine, for preventing the clogging of the fine nozzles. A large number of water-soluble dyes have been proposed for use as the ink colorant because of their high chroma, the wide variety of colours and shades available and their good water solubility.

In recent years pigments have become increasingly popular as the colorants for ink jet printing inks. While pigment-based inks may not have the chroma, colour variety or solubility of dyes and are more prone to suffer from storage stability problems due to precipitation, some printer manufacturers prefer them for certain uses because of the high light-fastness and the high water-fastness properties of resultant prints. As conventional pigments are generally insoluble in water, they need to be dispersed in the ink vehicle by, for example, being intimately mixed with a dispersant. Inks are often prepared from pigment formulations containing pigment, dispersant, water and optionally further ingredients. In order to stably disperse a pigment in an aqueous liquid, it is necessary to study the type and particle diameter of pigments, the type of dispersants used, dispersing means and the like. Many dispersion methods and production processes for pigment inks for ink jet printing have been proposed in the art.

Inks for ink jet printers may be filtered to remove coarse particles and unnecessary materials that could reduce the print quality or otherwise block the fine nozzles used in ink jet printers. Typically these nozzles are half the diameter of a human hair and they can easily become blocked.

U.S. Pat. No. 6,562,117 describes the preparation of pigment-based ink jet printing inks by a process comprising crossflow membrane filtration using what appear to be conventional, organic membranes of non-uniform pore size. In these conventional membranes the quoted pore size is an average value and there is in fact great variation in the actual sizes of the pores. Filtration using conventional membranes such as those described in U.S. Pat. No. 6,562,117 can often be slow and time consuming. Also they let some over-sized pigment through.

US patent application No. 2001/0050017 describes an ink jet printing apparatus for oil-based, non-aqueous electrostatic inks. The printing apparatus includes a series of filters to remove dust and other particles from ink prior to contact with the fine nozzles in the printhead. According to FIGS. 10(*a*) and (*b*) one of these filters incorporated into the apparatus may have pores of uniform or non-uniform size and shape. Example 4 describes how omitting the filters from the apparatus resulted in the ejection of ink becoming unstable in only a few hours to a few days.

The filtration system included in the printing apparatus of US2001/0050017 has the disadvantage of increasing the cost of the printer in what is becoming an increasingly price sensitive market. Furthermore, over time the filters in such printers will eventually become clogged, forcing the user to either buy a replacement printer or go to the trouble and expense of cleaning or replacing the filters. Such cleaning can be messy due to the highly coloured nature of inks.

According to a first aspect of the present invention there is provided a process for manufacturing an ink, or for making a pigment formulation for use in the manufacture of an ink, the process comprising filtration of a composition comprising a particulate pigment and a liquid medium through an inorganic filter having pores of a uniform size below 10 microns.

The process of the present invention has the advantage of providing inks in a time efficient and cost effective manner, often using lower pressures for filtration than would be required relative to the use of conventional filters having non-uniform pore sizes. The inks can be used in printers without the need for the special array of filters described in US2001/0050017, thus making printers cheaper in this increasingly cost conscious market. The resultant inks may be retrofitted into existing printers which have the filter arrays described in US2001/0050017 because they will be less likely to cause the filters to clog than conventional inks. Furthermore, the inorganic filters are particularly resistant to the organic solvents used in ink manufacture which could otherwise dissolve or damage an organic filter and they allow filtration at higher temperatures. Still further, if the inorganic filters used in the present process do become blocked it is possible to use more aggressive cleaning means than would be the case for conventional membranes. Conventional filters can also swell in the presence of solvent, thus making filtration more slow.

The process of the present invention has advantages over the use of conventional filters (e.g. depth filters) in that the accurate pore sizes do not let over-sized particles through. With conventional filters it can prove necessary to use a much smaller pore size than the size of the ultimate printhead nozzle for which the pigment ink is intended. This is to ensure over-sized particles all removed and while this can be effective it suffers from the disadvantage that flow rate is reduced (because the pores in the filter are smaller) and also many small particles are excluded which would not actually cause a problem in ink jet printers, leading to significant waste of pigment.

Preferably the inorganic filter is a cross-flow filter. "Cross-flow" refers to an operation such that, during filtration, the liquid to be filtered is allowed to flow along the surface of the filter and the desired, filtered liquid which permeates through the filter is collected from the opposite side of the filter.

Preferably the inorganic filter has pores of a uniform size below 8 microns, more preferably below 6 microns, especially 5 microns or less, more especially below 4.5 microns. In one embodiment the inorganic filter has a pore size of 0.1 to 4.2 microns, especially 0.3 to 3 microns.

In a preferred embodiment of the process the filter is periodically back-flushed thereby reducing the likelihood of the filter becoming clogged. Thus while normal filtration involves the composition passing from the retentate side of the filter to the permeate side of the filter, a back flush involves the return of filtered composition from the permeate side of the filter to the retentate side of the filter thereby dislodging any particulate or other matter blocking any of the filter pores. A suitable device for causing back-flushing is described in Dutch patent application NL 1024292.

A preferred embodiment of the process comprises the additional step of reducing a decline in the flow rate of the composition through the inorganic filter by adjusting the pH and/or ionic strength of the composition. The pH and/or ionic strength of the composition may be adjusted by the addition of acid, base or salt as required, preferably to achieve the preferred pH indicated below. The pH and/or ionic strength may be adjusted before, during or after filtration.

If desired the process may also comprise the further step of removing any particulate matter having a particle size below a desired value, for example using a filter having a pore size corresponding to the desired value.

The use of pH and/or ionic strength adjustment to enhance the flow rate of a pigment composition through a filter forms a further feature of the present invention, the filter preferably being an inorganic filter having pores of a uniform size below 10 microns with further preferences being as herein described in relation to the first aspect of the invention). The pigment composition is preferably an aqueous pigment composition.

Preferably the process comprises the further step of passing the ink or pigment formulation to a vessel such that the vessel contains at least 1 litre of the ink or pigment formulation in fluid form, more preferably at least 10 litres of ink or pigment formulation in fluid form.

Preferably the inorganic filter comprises an inorganic macroporous support and an inorganic sieve layer having pores of a uniform size below 10 microns (preferably at or below 5 microns) connected rigidly to a surface of the macroporous support. The inorganic sieve may be deposited on the inorganic macroporous support by a deposition method. Preferably the macroporous support has pores which are at least twice the size of the pores in the inorganic sieve, typically of a mean pore size in the range of 0.25 microns to 25 microns. Generally the pores of the sieve layer comprising perforations at right angles to the sieve layer, and being formed with a diameter in the range of 0.5 to 5 or 0.5 to 10 microns. The pores may be any shape but preferably they are round, rectangular or rectangular with rounded edges. The pore size refers to the maximum internal dimension of the pore. For example with circular pores the pore size is the diameter and in rectangular pores the pore size is the diagonal distance across the rectangle.

Preferably the pores in the sieve layer have been formed by etching.

Preferably the sieve layer has a thickness of at most ten times the diameter of the pores therein.

Preferably the surface roughness of the filter is considerably less than the pore size.

In one embodiment the support and/or the sieve layer is composed of a ceramic substance.

Preferably the sieve layer comprises a substance selected from the group consisting of silicon dioxide, silicon nitride, silicon carbide, alumina, zirconium oxide, titanium oxide, titanium nitride, gold, silver, chromium, cobalt, nickel, aluminium, titanium, chromium alloys, carbon and silicon.

Preferably the support comprises a substance selected from the group consisting of silicon dioxide, silicon nitride, silicon carbide, alumina, titanium nitride, titanium, carbon and silicon.

A number of inorganic filters which may be used in the present process are commercially available from Fluxxion B.V. and have hitherto been used in biological applications such as the separation of different types of cells and in the filtration of Bavarian beer.

Typically the inorganic filters used in the present process may be obtained by a process comprising:
 a. depositing an inorganic layer on a surface of a support by chemical vapour deposition or sputtering,
 b. forming on the inorganic layer a photo-lacquer layer,
 c. exposing said photo-lacquer layer to a regular mask pattern with the use of a suitable photo source,
 d. developing said lacquer layer,
 e. thereafter etching the mask pattern in the inorganic layer with an etchant, forming perforations shaped as channels, at right angles to the inorganic layer, thereby forming the inorganic sieve layer.

The preparation of suitable filters for use in the present process is described in U.S. Pat. No. 5,543,046, column 2, line 20 to column 6, line 38 and FIGS. 1 to 16 thereof, which are incorporated herein by reference thereto. Further techniques for making filters for use in the present process are described in U.S. Pat. No. 5,753,014.

Preferably the inorganic filter has a thickness of from 20 to 2000 microns.

The inorganic filter may be any suitable shape, for example it may be substantially flat, cylindrical or conical.

Preferably at least 95%, more preferably at least 99% of the pores in the sieve layer have a pore size within 5% of the average pore size for the pores of the sieve layer.

We have found that filtration of pigments using inorganic filters as described in the present process is often much quicker than using conventional filters of non-uniform pore size (e.g. depth filters). While not wishing to be limited to any particular theory this may be because in an inorganic filter of uniform pore size there are no or few under-sized pores restricting the permeate flow.

Furthermore, the absence of or significant reduction in the number of over-sized pores in the inorganic filters of the present invention means particles above the average pore size simply cannot pass through the sieve (in contrast to conventional filters having a relatively broad range of pore sizes around an average value).

A wide variety of pigments may be used in the process of the present invention, including inorganic pigments and organic pigments. Suitable inorganic pigments include, in addition to titanium oxide and iron oxide, carbon blacks produced by conventional processes, such as contact, furnace, and thermal processes. Suitable organic pigments include azo pigments (for example azo lake, insoluble azo pigments, condensed azo pigments and chelate azo pigments), polycyclic pigments (for example, phthalocyanine, perylene, perinone, anthraquinone, quinacridone, dioxazine, thioindigo, isoindolinone and quinophthalone pigments), dye-type chelate pigments (for example, basic dye-type chelate pigments and acid dye-type chelate pigments), nitro pigments, nitroso pigments and aniline black pigments.

Suitable carbon black pigments include: carbon blacks manufactured by Mitsubishi Chemical Corporation, for example, No. 2300, No. 900, MCF 88, No. 33, No. 40, No. 45, No. 52, MA 7, MA 8, MA 100 and No. 2200 B; carbon blacks manufactured by Columbian Carbon Co., Ltd., for example, Raven™ 5750, Raven™ 5250, Raven™ 5000, Raven™ 3500, Raven™ 1255 and Raven™ 700; carbon blacks manufactured by Cabot Corporation, for example, Regal™ 400 R, Regal™ 330 R, Regal™ 660 R, MogulL™, Monarch™ 700, Monarch™ 800, Monarch™ 880, Monarch™ 900, Monarch™ 1000, Monarch™ 1100, Monarch™ 1300 and Monarch™ 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex™ 35, Printex™ U, Printex™ V, Printex™ 140 U, Special Black 6, Special Black 5, Special Black 4 A and Special Black 4.

Suitable yellow pigments include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14 C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185 and C.I. Pigment Yellow 213.

Suitable magenta pigments include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184 and C.I. Pigment Red 202.

Suitable cyan pigments include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4 and C.I. Vat Blue 60.

The pigment may be a conventional pigment, as in the above examples, or it may be a surface treated pigment, for example a pigment treated to attach water solubilising or dispersing groups to its surface. Such surface treated pigments are available from a number of sources, including the pigments sold under the Cab-o-Jet™ trade mark by Cabot Corporation.

In our experiments we found the flow rates through the filters can sometimes be slower at acidic pH than at alkaline pH. Bearing this in mind, the pH of the composition is preferably 7 to 14, more preferably 8.5 to 13.5, especially 10 to 13.

The composition preferably has an ionic strength of at least 0.1 mmol per litre, more preferably 0.4 to 1000 mmol per liter, more preferably 1 to 100 mmol per litre, especially 5 to 50 mmol per litre. We have found that use of such ionic strengths leads in many cases to improved flow rates through the filters. It is preferable that the ions present include one or more of those cations of Group 1 and 2 metals of the Periodic Table. Especially preferred examples of such cations include Na$^+$, K$^+$ and Li+ Ionic strength (I) in mol per litre can be calculated by the formula:

$$I=0.5\Sigma\{c_i z_i^2\}$$

wherein:

$c_i$ is the concentration of i'th ion in mol per litre and $z_i$ is its charge; and the summation is done for all ions in the composition.

For example, a 2 molar solution of MgCl$_2$ would have an ionic strength of $0.5\Sigma\{(2\times(2)^2)+(4\times(-1)^2\}=0.5\times12=6$ mol per liter.

We have also found that the temperature at which the filtration is performed can affect the flow rate. In our experiments we found that filtration temperatures of 0 to 50° C., especially 20 to 30° C. are preferred.

Preferably the process is performed at trans-filter pressure drop of up to 20,000 Pascal, more preferably up to 15,000 Pascal. The process of the present invention has a significant advantage over depth filters having non-uniform pore size in that they require much higher trans-filter pressures to achieve a given flow rate than when the filters of the present invention are used.

The liquid medium preferably comprises water and optionally one or more organic solvents. Examples of suitable organic solvents are described in more detail below in relation to potential ink components. Typically the liquid medium will further comprise a dispersant and/or surfactant.

Preferably the process is performed such that the flow rate of the composition through the inorganic filter is at least 5,000 litres/m$^2$/hour, more preferably at least 10,000 liters/m$^2$/hour, especially 20,000 to 60,000 liters/m$^2$/hour.

Preferred pigment formulations are pigment concentrates. Whether it is an ink or pigment concentrate arising from the process depends to a large extent on the wishes of the person performing the process and the concentration of pigment in the resultant liquid. Typically inks will have a lower concentration of pigment than a pigment concentrate, e.g. the former may typically comprise 0.1 to 10 wt % of pigment while the latter may typically comprise 5 to 50 wt % of pigment (preferably 10.1% to 30 wt %). In this specification the term "wt %" refers to the weight of the relevant component expressed as a percentage relative to the total weight of the relevant composition (e.g. the ink).

The pH of the ink is preferably 4 to 11. The ink preferably has a viscosity at 25° C. of less than 50 cP, more preferably less than 25 cP, especially less than 15 cP and especially less than 5 cP. The viscosity for pigment formulations may be much higher than for inks because such formulations are further processed (e.g. by dilution with water and/or organic solvents and/or by addition of further dispersants, surfactants etc.).

Preferably the ink and the pigment formulations are aqueous, for example typically they comprise 50 to 97 wt % water. The amount of organic solvent in the inks is typically 2.9 to 40 wt % and in the pigment formulations the amount of organic solvent may be, for example, 0 to 50 wt %.

The organic solvent may be any of the solvents used in ink jet printing inks.

The ink preferably comprises a particulate pigment obtained by the process of the present invention and a liquid medium comprising water and an organic solvent.

When the liquid medium of the ink comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include C$_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-C$_{1-4}$-alkyl ethers of diols, preferably mono-C$_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Ink media comprising an organic solvent free from water are particularly useful where fast drying times are required and particularly when printing onto hydrophobic and non-absorbent substrates, for example plastics, metal and glass.

An especially preferred ink comprises:
(i) 0.1 to 10 wt %, more preferably 0.5 to 8 wt % of particulate pigment obtained by the process of the first aspect of the present invention;
(ii) 3 to 50 wt %, more preferably 5 to 45 wt %, especially 10 to 40 wt % of organic solvent; and
(iii) 49.9 to 96.9 wt %, more preferably 60 to 85 wt % water.

The ink may of course contain customary ink additives, for example high-boiling organic solvents, surfactants, dispersants, binders, saccharides and saccharide derivatives, alkali hydroxides, buffers, humectants, preservatives, antimolds, glycols, anti-paper curl agents and anti-kogation agents.

The process of the present invention can be used to prepare inks and the pigment formulations having an accusizer number of less than $10^7$ particles per $cm^3$ greater than 1 micron (more preferably less than $10^8$ particles per $cm^3$, especially less than $5 \times 10^5$ particles per $cm^3$ and more especially less than $10^4$ particles per $cm^3$ greater than 1 micron) when measured at 15 wt % pigment content.

With respect to the accusizer number, this number is a measurement of the number of particles per $cm^3$ of ink or pigment formulation having a certain size or greater in a liquid at a certain wt % of pigment content.

Accusizer Tests may be performed as follows:
AccuSizer Model 780 (available from PSS NICOMP, Santa Barbara, Calif.), with settings:
Collection Time 60 sec,
Number Channels 128,
Vessel Fluid Volume 60 $cm^3$,
Flow Rate 60 $cm^3$/min,
Max Coincidence 9000,
Number 1, Sample preparation: 0.3 $cm^3$ of ink or pigment formulation is diluted in 100 $cm^3$ DI water. Then 0.2 $cm^3$ of the diluted sample is injected into accusizer vessel. The total number of particles per $cm^3$ greater than 1 micron were recorded and adjusted to reflect the concentration of particles per $cm^3$ of the initial ink or pigment formulation corrected to the appropriate solids level.

Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether; 2-pyrrolidone and N-methyl-2-pyrrolidone; 1,3-dimethyl-2-imidazolidinone; and triethanolamine.

Among them, the use of water-soluble organic solvents having a boiling point of 180° C. or above is preferred. The use of water-soluble organic solvents having a boiling point of 180° C. or above can impart water retention and wetting properties to the ink composition. As a result, excellent storage stability can be realized. Further, an ink composition can be realized which, even when allowed to stand in an open state, that is, when allowed to stand in contact with air at room temperature, can maintain the fluidity and the redispersibility for a long period of time and, in addition, when used in ink jet printing, does not cause clogging of nozzles during printing or at the time of restarting after interruption of printing, thus offering high ejection stability.

Examples of water-soluble organic solvents having a boiling point of 180° C. or above include ethylene glycol (b.p.: 197° C.; the boiling point being hereinafter described within parentheses), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), N-methyl-2-pyrrolidone (202° C.), 1,3-dimethyl-2-imidazolidinone (257-26° C.), 2-pyrrolidone (245° C.), glycerin (290° C.), tripropylene glycol monomethyl ether (243° C.) dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.) and diethylene glycol monomethyl ether (194° C.). Among these water-soluble organic solvents, those having a boiling point of 200° C. or above are preferred. These water-soluble organic solvents may be used alone or as a mixture of two or more of the same.

The content of the high-boiling organic solvent is preferably about 0.01 to 10 wt %, more preferably about 0.1 to 5 wt %.

Water-soluble organic solvents usable herein include tertiary amines. The addition of tertiary amines can impart wetting properties to the ink. Specific examples of tertiary amines include trimethylamine, triethylamine, triethanolamine, dimethylethanolamine, diethylethanolamine, triisopropanolamine and butyldiethanolamine. They may be used alone or as a mixture of two or more. The amount of the tertiary amine added to the ink is preferably about 0.1 to 10 wt %, more preferably about 0.5 to 5 wt %.

Examples of preferred dispersants include synthetic polymers and examples thereof include: polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer and acrylic acid/acrylic ester copolymer; styrene/acryl resins, such as styrene/acrylic acid copolymer, styrene/methacrylic acid copolymer, styrene/methacrylic acid/acrylic ester copolymer, styrene/.alpha.-methylstyrene/acrylic acid copolymer and styrene/.alpha.-methylstyrene/acrylic acid/acrylic ester copolymer; styrene/maleic acid copolymer; styrene/maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer and vinyl acetate/acrylic acid copolymer; and salts of the above polymers. Among them, a copolymer of a monomer having a hydrophobic group in its molecular structure with a monomer having a hydrophilic group in its molecular structure and a polymer of a monomer having both a hydrophobic group and a hydrophilic group in its molecular structure are particularly preferred.

Specific examples of surfactants include: anionic surfactants, such as acetylene glycols, sodium dodecylbenzenesulfonate, sodium laurylate and ammonium salt of polyoxyethylene alkyl ether sulphates; nonionic surfactants, such as polyoxyethylene alkyl ethers, polyoxyethylene alkyl esters, polyoxyethylene sorbitan fatty acid esters, polyoxyethylene alkylphenyl ethers, polyoxyethylenealkylamines and polyoxyethylenealkylamides; and amphoteriic surfactants, such as N,N-dimethyl-N-alkyl-N-carboxymethylammonium betaine, N,N-dialkylaminoalkylenecarboxylates, N,N,N-trialkyl-N-sulfoalkyleneammonium betaine, N,N-dialkyl-N,N-bispolyoxyethyleneammoniumsulfonic ester betaine and 2-alkyl-1-carboxymethyl-1-hydroxyethylimidazoliniumbetaine. They may be used alone or in combination of two or more of the same.

In the present invention, preferably, an acetylene glycol surfactant is preferably incorporated in the ink and/or pigment formulation. Specific examples of preferred acetylene glycol surfactants usable in the present invention include 2,4,7,9-tetramethyl-5-decyne-4,7-diol, 3,6-dimethyl-4-octyne-3,6-diol and 3,5-dimethyl-1-hexyn-3-ol. Commercially available products may also be used as the acetylene glycol surfactants represented by formula (I). Specific examples thereof include Surfynol™ 104, Surfynol™ 82, Surfynol™ 465, Surfynol™ 485 and Surfynol™ TG (available from Air Products and Chemicals Inc.) and OLFINE™ STG and OLFINE™ E 1010 (manufactured by Nissin Chemical Industry Co., Ltd.).

The pigment formulations (e.g. concentrates) preferably comprise a filtered particulate pigment obtained by the process of the present invention and a liquid medium comprising water and optionally an organic solvent. Thus the pigment formulations are much as described above for the inks except that the organic solvent is optional and generally the pigment content is higher than in an ink. Pigment concentrates are useful because they may be kept as a stock material for later manufacture of inks and they are relatively compact and cheaper to transport due to the lower content of liquid medium. To convert a pigment concentrate into an ink one simply needs to add water and/or organic solvent and any desired ink additives.

The ink composition is preferably for use in ink jet printer, more preferably a thermal or piezo ink jet printer.

Specific examples of ink additives include alkali hydroxides and examples thereof include potassium hydroxide, sodium hydroxide and lithium hydroxide. The amount of the alkali hydroxide added is preferably about 0.01 to 5 wt %, more preferably about 0.05 to 3 wt %.

The amount of the surfactant included in the ink is preferably 0.01 to 10 wt %, preferably 0.1 to 5 wt %

The ink preferably contains a glycol ether, for example ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether and dipropylene glycol mono-iso-propyl ether. They may be used alone or as a mixture of two or more organic solvents.

A further useful class of ink additives are saccharides and saccharide derivatives because these can imparts water retention properties to the ink composition. In particular, the use of the saccharide or the saccharide derivative in combination with a salt or a derivative of hyaluronic acid can impart significant water retention properties to the ink.

Examples of saccharides include monosaccharides, disaccharides, oligosaccharides (including trisaccharides and tetrasaccharides) and polysaccharides and preferred examples thereof include glucose, mannose, fructose, ribose, xylose, arabinose, galactose, aldonic acid, glucitol, sorbit, maltose, cellobiose, lactose, sucrose, trehalose and maltotriose. The polysaccharides refer to saccharides in a wide sense and embrace materials which widely exist in the natural world, such as alginic acid, .alpha.-cyclodextrin and cellulose. Derivatives of these saccharides include reducing sugars of the above saccharides (for example, sugar alcohols represented by the general formula $HOCH_2 (CHOH)_n CH_2 OH$ wherein n is an integer of 2 to 5), oxidized sugars (for example, aldonic acid and uronic acid), amino acid and thiosugars. Sugar alcohols are particularly preferred and specific examples thereof include maltitol and sorbitol. The content of the saccharide or the saccharide derivative is preferably about 0.1 to 40 wt %, more preferably about 2.5 to 20 wt %.

A still further ink additive is glycerine because in many inks it can reduce the likelihood of the ink drying at the front face of nozzles in a recording head and thus can help prevent nozzle clogging. The amount of glycerine added is about 5 to 40 wt %, preferably about 10 to 20 wt %.

Examples of preservatives or anti-moulds include sodium benzoate, pentachlorophenol sodium, 2-pyridinethiol-1-oxide sodium, sodium sorbate, sodium dehydroacetate and 1,2-dibenzothiazolin-3-one (Proxel® CRL, Proxel® BDN, Proxel® GXL, Proxel® XL-2 and Proxel® TN, manufactured by Arch Chemicals).

A further feature of the present invention provides an ink or a pigment formulation obtained by a process according to the first aspect of the present invention.

A further feature of the present invention provides an ink jet printer cartridge comprising a chamber and an ink wherein the ink is present in the chamber and has been obtained by a process according to the first aspect of the present invention.

The invention also provides an ink jet printer comprising such cartridge and a printing mechanism and a process for printing a substrate comprising applying thereto by means of an ink jet printer an ink obtained by a process according to the first aspect of the present invention or an ink as hereinbefore described.

The present invention will now be illustrated by the following non-limiting examples wherein all parts are by weight unless otherwise stated.

The examples described in U.S. Pat. No. 6,562,117 may be repeated except that in place of the sieves used therein there are used the fluXXbox, fluXXlab or fluXXpilot filtration products from Fluxxion B.V. of the Netherlands containing 5.0, 3.5, 2.0 or 1.2 micron filters.

EXAMPLE 1

Effect of Uniform Inorganic Filters

Step 1—Preparation of a Composition Comprising a Particulate Pigment

BYK 190™ (60 g, obtained from BYK Chemie) and deionised water (790 g) were added to a stainless steel beaker and stirred for 1 minute, using a Greaves Laboratory Mixer 135 (Model A High Shear Mixer), at low speed to produce a homogeneous mixture of polymer and deionised water without causing foam. To this mixture, Pigment Red 122 (150 g, available from e.g. Ciba, Clariant, Sun Chemicals etc.) was added slowly and mixed into the liquid using the Greaves Mixer. When all the pigment was wetted into the liquid, the Greaves mixer was run at 5000 rpm for approximately 15 minutes to produce a homogeneous pigment dispersion.

The pigment dispersion produced above was transferred to a Netzsch Mini-Zeta Laboratory Bead mill (available from Netzsch —Feinmahltechnik). The bead mill had previously been loaded with 200 ml of 0.5 mm yttrium stabilised ceramic grinding media (available from Netzsch - Feinmahltechnik). The pigment dispersion was milled for 5 hours at 3000 rpm in the bead mill and then discharged to a container.

The above milled dispersion was diluted with deionised water to form a pigment dispersion of 2% concentration, hereinafter referred to as the Unfiltered Dispersion. The Unfiltered Dispersion was transferred to 5 litre pressure vessel connected to a Pall Segment filter Model SAH0101G04J. This filter was fitted with a 0.3 micron depth filter cartridge Ref.AB01Y00318J. The pressure vessel was pressurised to 150,000 Pascal absolute and the pigment dispersion was filtered. The purpose of this filtration was to remove any grossly oversized particulate matter which might interfere with the subsequent particle size analysis (in routine practice of the invention it would not be necessary to measure particle sizes so there would be there would be no need to perform this depth filtration).

The resultant pigment dispersion ("Dispersion 1") had a pH of 6.

A portion of Dispersion 1 was adjusted to pH 12 using sodium hydroxide solution (45% strength) to give Dispersion 2.

Step 2—Spiking with 4.0 Micron Polystyrene Micro Spheres

Dispersion 2 was spiked with 4.0 micron polystyrene micro spheres at a level of 5 ml of micro spheres per 1 litre of dispersion. These micro spheres were the type used for particle size standards e.g. 'Micro Particles size standard based on polystyrene, monodisperse 4.0 micron, Product-No: 81494' available from Fluka Sigma-Aldrich. The resultant dispersion was called Spiked Dispersion 2.

Step 3A—Filtration with Filters of Uniform Pore Size

Filters having a uniform pore size of 3.5 microns or 5 microns were obtained from fluXXion B.V. of Eindhoven, The Netherlands (fluXXlab™ cross-flow filtration systems). Each filter was activated (rendered hydrophilic) in accordance with the manufacturers instructions.

Spiked Dispersion 2 was filtered using the fluXXlab™ cross-flow filtration systems containing filters having pores having a uniform pore size of 3.5 microns or 5 microns. The system settings were as follows:

| | |
|---|---|
| crossflow rate | 2.3 litres per minute |
| crossflow pressure drop | 20,000 Pascal |
| trans-membrane pressure | 10,000 Pascal maximum |
| backpulse pressure-maximum | |

The dispersions resulting from the uniform pore size 3.5 micron filter is referred to as Spiked Dispersion 3.

The dispersions resulting from the uniform pore size 5 micron filter is referred to as Spiked Dispersion 4.

Step 3B—Comparative—Filtration of Spiked Dispersion with a Depth Filter

Spiked Dispersion 2 was filtered through a 5 micron depth filter. The resultant dispersion is referred to as Spiked Dispersion 5.

Step 4—Measuring Particle Size Distribution

The four dispersions arising from Step 2, Step 3A and 3B (i.e. Spiked Dispersions 2, 3, 4 and 5) were analysed using a Nicomp Accusizer APS 780 particle size analyser. This device counts only particles above a set threshold size. By ignoring the vast majority of the particles below the threshold it is thus able to clearly distinguish changes in the absolute numbers of particles above that threshold and to display a size profile for those larger particles.

Results

FIG. 1. shows the particle size distribution of the Spiked Dispersion 2. As this was not filtered at all after addition of the 4.0 micron polystyrene micro spheres a peak corresponding to these spheres is clearly visible.

Figure 2:
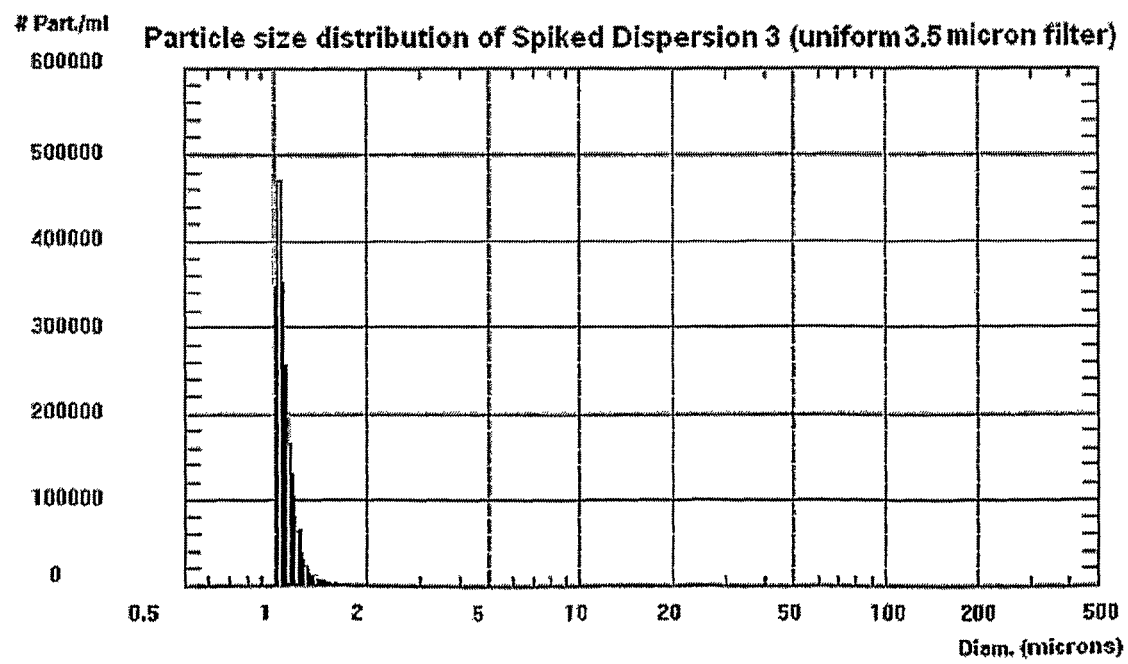

FIG. 2. shows the particle size distribution of the Spiked Dispersion 3 (resulting from the uniform pore size 3.5 micron filter). There is no peak at about 4 microns because the 3.5 micron uniform pores removed all of the 4.0 micron polystyrene micro spheres.

Figure 3:
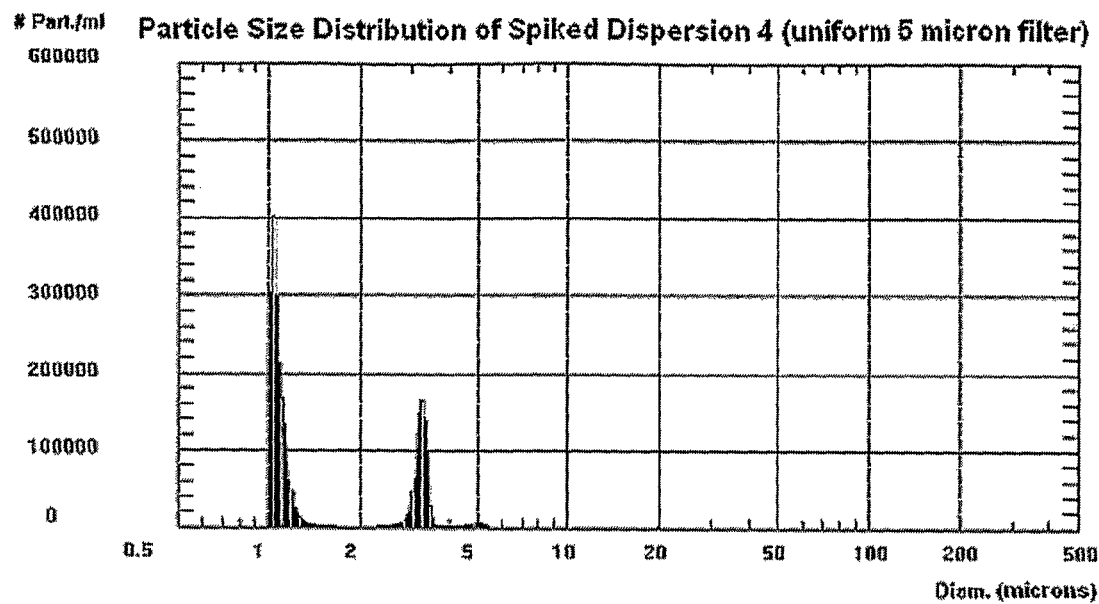

FIG. 3. shows the particle size distribution of the Spiked Dispersion 4 (resulting from the uniform pore size 5 micron filter). The peak at about 4 microns can be seen clearly and is present because the uniform 5 micron pores did not remove the smaller 4.0 micron polystyrene micro spheres.

Figure 4:
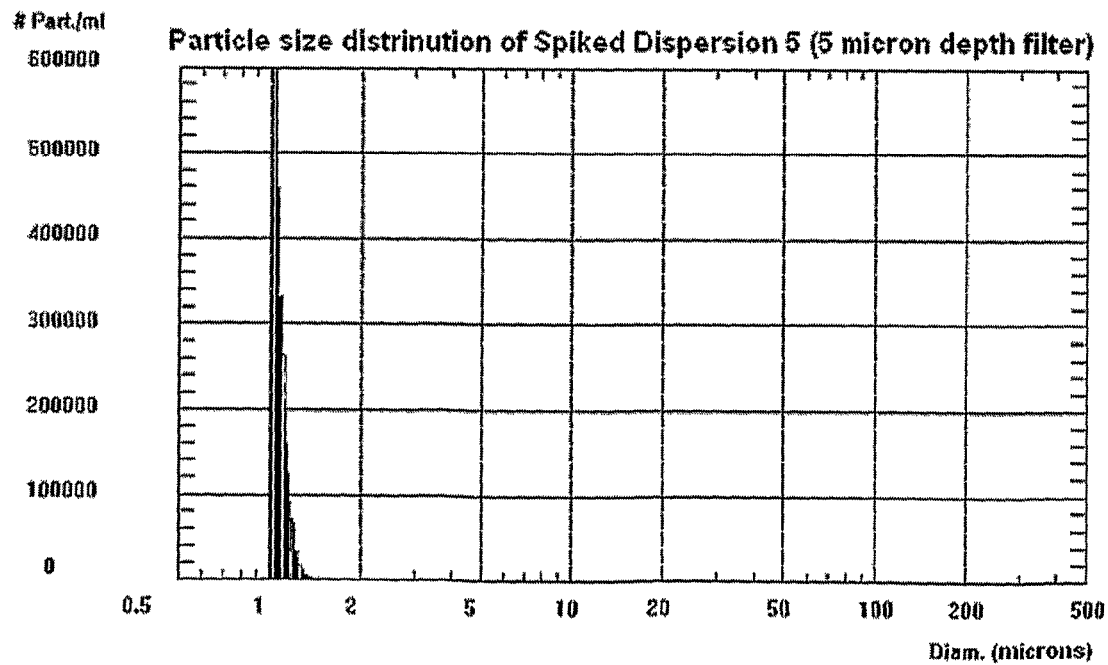

FIG. 4. shows the particle size distribution of Spiked Dispersion 5 (resulting from filtration of a dispersion containing 4.0 micron micro spheres with a 5 micron depth filter). The 4.0 micron micro spheres were removed by the 5 micron depth filter even though the filter notionally has a pore size bigger than the micro spheres. This is in sharp contrast to FIG. 3. where a uniform 5 micron filter did not remove the 4 micron micro spheres.

EXAMPLE 2

Effect of pH

Step 1—Preparation of Dispersions 6 and 7

Dispersion 6 having a pH of 6 was prepared by the method described in Example 1 for Dispersion 1 except that the milling was conducted for 3 hours instead of 5 hours.

Dispersion 7 was prepared by adjusting the pH of Dispersion 6 to 12 using sodium hydroxide solution.

Step 2—Filtration with Filters of Uniform Pore Size

Dispersions 6 and 7 were filtered through Filters having a uniform pore size of 3.5 microns by the method of Example 1, Step 3A, and the permeate flow-rate was recorded against time. For dispersion 7 (pH12) the flow rate did not change noticeably even after 30 minutes of filtration. However for Dispersion 6 (pH 6) the flow rate dropped by 50% after 7 minutes.

Dispersions 6 and 7 were similarly filtered through Filters having a uniform pore size of 2 microns. For dispersion 7 (pH12) the flow rate did not change noticeably even after 30 minutes of filtration. However for Dispersion 6 (pH6) the flow rate dropped by 50% after only a few minutes.

EXAMPLE 3

Particle Size Distribution Maintained

Dispersion 8 was prepared by the method described in Example 1 for the Unfiltered Dispersion, except that milling was conducted for 1 hour instead of 5 hours and the pH was adjusted to 12 using sodium hydroxide solution.

Dispersion 9 was prepared by filtering a portion of Dispersion 8 through a 5 micron depth filter using the general method outlined in Example 1, Step 1.

Dispersion 10 was prepared by filtering a portion of Dispersion 8 through a filter having a uniform pore size of 5 microns using the general method outlined in Example 1, Step 3A.

The particle size distribution of Dispersions 8, 9 and 10 were measured using an Malvern Mastersizer 2000 laser diffraction particle size analyser. The results are shown on FIG. 5.

Figure 5:
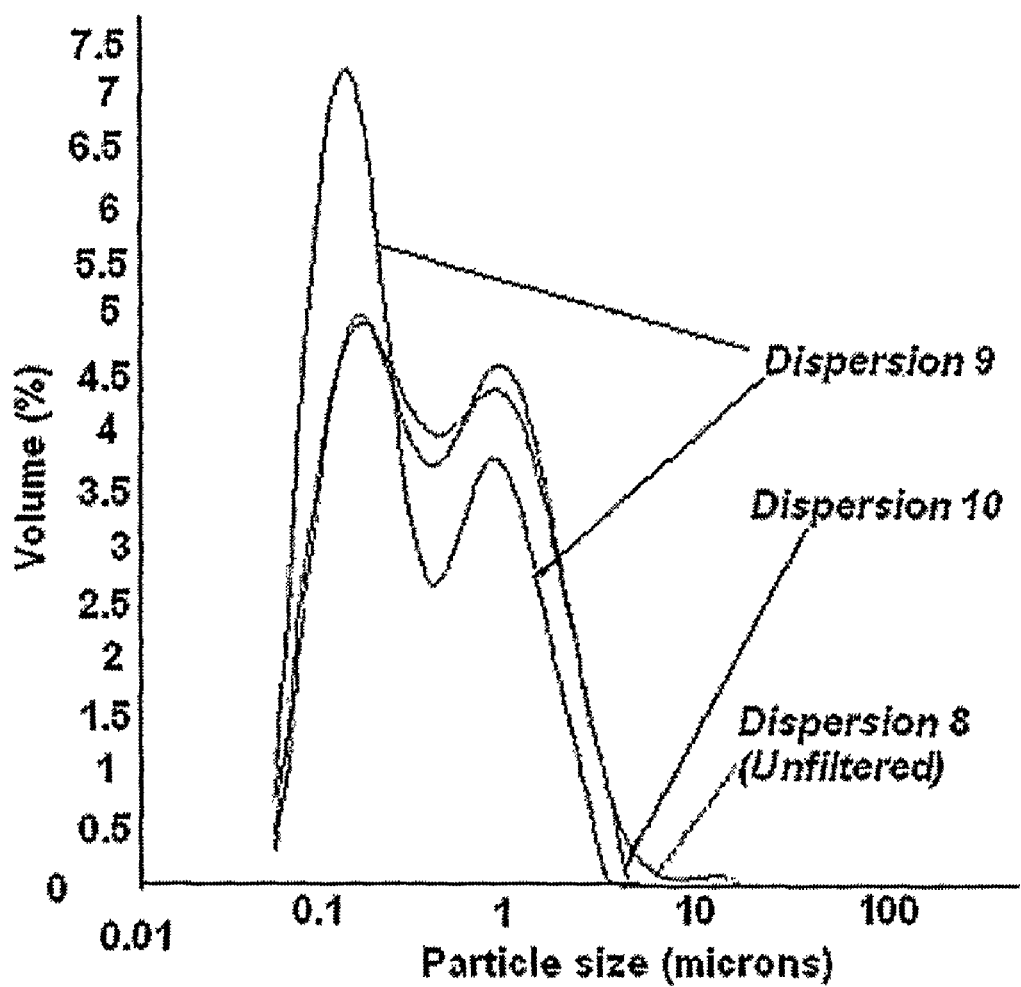

FIG. 5 shows that both Dispersion 9 (depth filtered) and Dispersion 10 (uniform filter) removed unwanted material of size>5 microns which could block the fine nozzles of an ink jet printer. However, what FIG. 5. also shows is that in order to remove the particles above 5 microns in size the particle size the depth filter also removed a substantial proportion of material between 0.5 and 5 microns, as evidenced by the change in peak profile for Dispersion 9 (depth filtered) compared to Dispersion 8 (not filtered). In contrast, the peaks at about 0.1 and 1 microns for Dispersion 10 (made using a filter with pores having a uniform size of 5 microns) have a very similar profile to the unfiltered Dispersion 8, indicating that material in the 0.1 to 5 micron size range was not lost. Therefore use of the uniform filter was less wasteful than the depth filter.

EXAMPLE 4

An ink may be prepared as follows. Dispersion 2 is concentrated to 15% solids content using a 1000 Dalton ultrafiltration membrane, also removing dissolved salts in the process. The resultant pigment concentrate (33 parts) is mixed with glycerin (10 parts), triethylene glycol monobutyl ether (8 parts), Sufynol™ 465 (1 part, from Nissin Chemical Industry Co., Ltd.) and water (48 parts), wherein all parts are by weight, to give an ink. The resultant ink may be printed onto paper using the piezo ink jet printer EM-900C manufactured by Seiko Epson.

EXAMPLE 5

Example 4 may be repeated except that in place of Dispersion 2 there is used the filtered Dispersion 7 arising from Example 2, Step 2.

EXAMPLES 6 TO 11

Further inks may be prepared using Dispersion 2 and filtered Dispersion 7 concentrates (15% solids content) as shown in Table 1 below, wherein the numbers represent the number of parts of the relevant ingredients by weight:

TABLE 1

|  | Ex. 6 | Ex. 7 | Ex. 8 | Ex. 9 | Ex. 10 | Ex. 11 |
| --- | --- | --- | --- | --- | --- | --- |
| Dispersion 2 | 27 | 0 | 15 | 32 | 20 | 0 |
| Filtered Dispersion 7 | 0 | 31 | 15 | 0 | 10 | 29 |
| TEGmBE | 2 | 3 | 3 | 1 | 1 | 1.5 |
| 1,2-hexane diol | 3 | 3 | 2 | 4 | 3 | 2.5 |
| Glycerin | 10 | 9 | 11 | 14 | 10 | 12 |
| TMP | 4 | 3 | 4 | 5 | 4 | 4.9 |
| Surfynol ™104 | 0.1 | 0.1 | 0.1 | 0.1 | 0.1 | 0.1 |
| Ion-exchanged water | 53.9 | 50.9 | 49.9 | 43.9 | 51.9 | 50.0 |

TEGmBE is triethylene glycol monobutyl ether, TMP is trimethylolpropane and Surfynol ™104 is an acetylene glycol surfactant made by Nissin Chemical Industry Co., Ltd.

The invention claimed is:

1. A process for manufacturing an ink jet printing ink, or for making a pigment formulation for use in the manufacture of an ink jet printing ink, the process comprising filtration of a composition comprising a particulate pigment and a liquid medium through an inorganic filter having pores of a uniform size below 10 microns, said composition as filtered being maintained at a pH of 8.5 to 13.5.

2. A process according to claim 1 further comprising the step of passing the thus filtered composition to a vessel such that the vessel contains at least 1 litre of the ink or pigment formulation in fluid form.

3. A process according to claim 1 or claim 2 wherein the filtration is performed at a flow rate through the inorganic filter of at least 5000 liter/m2/hour.

4. A process according to claim 1 or claim 2 further comprising the step of mixing the filtrate obtained from the filtration with one or more ink additives.

5. A process according to claim 1 or claim 2 wherein the filter is periodically back-flushed thereby reducing the likelihood of the filter becoming clogged.

6. A process according to claim 1 or claim 2 wherein at least 95% of the pores in the sieve layer have a pore size within 5% of the average pore size.

7. A process according to claim 1 or claim 2 wherein the ink is an aqueous ink.

8. A process according to claim 1 wherein the ink comprises:
 (i) 0.1 to 10wt% of the filtered particulate pigment;
 (ii) 3 to 50wt% of organic solvent; and
 (iii) 49.9 to 96.9wt% water.

9. An ink jet printer cartridge comprising a chamber and an ink wherein the ink is present in the chamber and is as defined in claim 8.

10. In a process for manufacturing an ink, or for making a pigment formulation for use in the manufacture of an ink wherein a composition comprising a particulate pigment and a liquid medium is filtered, the improvement which comprises filtering said composition through an inorganic cross-flow filter having pores of a uniform size below 8 microns, the filter is periodically back-flushed to reduce the likelihood of clogging and the pH of the composition during filtering is maintained at 8.5 to 13.5.

11. The process of claim 10 wherein the inorganic filter comprises an inorganic macroporous support and an inorganic sieve layer having pores of uniform size below 5 microns, deposited on said support, the pores of the macroporous support being at least twice the size of the pores of the sieve layer.

12. The process of claim 10 wherein the pH of the composition is from 10 to 13; the ionic strength of the composition is at least 5 to 50 mmol per liter, the temperature of the composition is 20-30° C., the filtering is performed at a trans-filter pressure drop of up to 20,000 Pascal, and the process is performed at a flow rate of at least 5,000 liter/m2/hour.

* * * * *